United States Patent
Li et al.

(10) Patent No.: US 12,225,572 B2
(45) Date of Patent: Feb. 11, 2025

(54) CONFIGURATION FOR IN-X SUBNETWORKS

(71) Applicant: Nokia Technologies Oy, Espoo (FI)

(72) Inventors: Dong Li, Pudong Shanghai (CN); Tao Tao, Pudong Shanghai (CN); Hua Chao, Shanghai (CN); Yong Liu, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/728,909

(22) PCT Filed: Jan. 17, 2022

(86) PCT No.: PCT/CN2022/072259
§ 371 (c)(1),
(2) Date: Jul. 15, 2024

(87) PCT Pub. No.: WO2023/133873
PCT Pub. Date: Jul. 20, 2023

(65) Prior Publication Data
US 2025/0008542 A1 Jan. 2, 2025

(51) Int. Cl.
*H04W 72/54* (2023.01)
*H04W 72/0453* (2023.01)
*H04W 72/542* (2023.01)

(52) U.S. Cl.
CPC ..... *H04W 72/542* (2023.01); *H04W 72/0453* (2013.01)

(58) Field of Classification Search
CPC .......... H04W 72/542; H04W 72/0453
See application file for complete search history.

(56) References Cited

U.S. PATENT DOCUMENTS

2016/0295624 A1  10/2016  Novlan et al.
2019/0380128 A1* 12/2019  Park .................. H04W 88/10
(Continued)

FOREIGN PATENT DOCUMENTS

CN  111615192 A  9/2020
CN  112188633 A  1/2021
(Continued)

OTHER PUBLICATIONS

International Search Report issued by the National Intellectual Property Administration acting as the International Searching Authority in relation to International Application No. PCT/CN2022/072259 dated Oct. 20, 2022 (3 pages).
(Continued)

*Primary Examiner* — Brian D Nguyen
(74) *Attorney, Agent, or Firm* — Robert P. Michal, Esq.; Carter, DeLuca & Farrell LLP

(57) ABSTRACT

A method for in-X subnetwork includes obtaining, from a third device in a second network, resource configuration supporting communication between a first device and a second device in the first network, the communication including more than one traffic type, wherein the more than one traffic type is for data transmission between the first device and the second device without involving the third device, and a second traffic type of the more than one traffic type is for data transmission between the second device and the third device via the first device; determining, based at least on the resource configuration and the more than one traffic type, at least one resource pool to be used for the communication between the first device and the second device; and transmitting, to the second device, information indicative of the at least one resource pool.

1 Claim, 9 Drawing Sheets

(56) References Cited

U.S. PATENT DOCUMENTS

| | | | | |
|---|---|---|---|---|
| 2020/0314775 A1* | 10/2020 | Xu | ................... | H04L 41/40 |
| 2021/0014893 A1* | 1/2021 | Park | ................... | H04W 80/08 |
| 2021/0212099 A1* | 7/2021 | Yi | ................... | H04W 72/23 |
| 2021/0377939 A1* | 12/2021 | Chae | ................... | H04L 5/1469 |
| 2022/0039072 A1* | 2/2022 | Babaei | ................... | H04W 72/0446 |

FOREIGN PATENT DOCUMENTS

| | | | | |
|---|---|---|---|---|
| CN | 112205048 A | 1/2021 | | |
| CN | 113940123 A | 1/2022 | | |
| WO | 2020034610 A1 | 2/2020 | | |
| WO | WO 2021/155468 A1 * | 7/2022 | ............ | H04W 72/02 |

OTHER PUBLICATIONS

Written Opinion of the International Searching Authority issued by the National Intellectual Property Administration acting as the International Searching Authority in relation to International Application No. PCT/CN2022/072259 dated Oct. 20, 2022 (4 pages).

* cited by examiner

CONFIGURATION FOR IN-X SUBNETWORKS

CROSS-REFERENCE TO RELATED APPLICATIONS

This application is a national phase entry under 35 U.S.C. 371 of PCT International Application No. PCT/CN2022/072259 filed Jan. 17, 2022, the disclosure of this application is expressly incorporated herein by reference in its entirety.

FIELD

Embodiments of the present disclosure generally relate to the field of telecommunication and in particular to devices, methods, apparatuses and computer readable storage media of configuration for in-X subnetwork.

BACKGROUND

The 6th Generation (6G) radio access technology may be expected to support extreme communication requirements in terms of latency, reliability and/or throughput. For example, in the framework of the Industry 4.0, a wire-free factory is expected to be achieved, where wireless technology may be used for replacing cables also for the most demanding services. To this end, cable-like reliability shall be provided within the stringent latency requirement for some wireless isochronous real time use cases in industrial automation applications, which are even much more stringent than the service requirements for the cyber-physical control applications in vertical domains. These requirements are clearly beyond the capabilities of the current 5G system.

SUMMARY

In general, example embodiments of the present disclosure provide a solution of configuration for in-X subnetwork.

In a first aspect, there is provided a first device in a first network. The first device comprises at least one processor; and at least one memory including computer program code; the at least one memory and the computer program code are configured to, with the at least one processor, cause the first device at least to obtain, from a third device in a second network, resource configuration supporting communication between the first device and a second device in the first network, the communication comprising more than one traffic type, wherein a first traffic type of the more than one traffic type is for data transmission between the first device and the second device without involving the third device, and a second traffic type of the more than one traffic type is for data transmission between the second device and the third device via the first device; determine, based at least on the resource configuration and the more than one traffic type, at least one resource pool to be used for the communication between the first device and the second device; and transmit, to the second device, information indicative of the at least one resource pool.

In a second aspect, there is provided a second device in a first network. The second device comprises at least one processor; and at least one memory including computer program codes; the at least one memory and the computer program codes are configured to, with the at least one processor, cause the second device at least to receive, from a first device in the first network, information indicative of at least one resource pool to be used for communication between the first device and the second device, the communication comprising more than one traffic type, wherein a first traffic type of the more than one traffic type is for data transmission between the first device and the second device without involving a third device in a second network, and a second traffic type of the more than one traffic type is for data transmission between the second device and the third device via the first device; and perform the communication with the first device by using the at least one resource pool.

In a third aspect, there is provided a third device in a second network. The third device comprises at least one processor; and at least one memory including computer program codes; the at least one memory and the computer program codes are configured to, with the at least one processor, cause the third device at least to transmit, to a first device in a first network, resource configuration supporting communication between the first device and a second device in the first network, the communication comprising more than one traffic type, wherein a first traffic type of the more than one traffic type is for data transmission between the first device and the second device without involving the third device, and a second traffic type of the more than one traffic type is for data transmission between the second device and the third device via the first device.

In a fourth aspect, there is a method. The method comprises obtaining, at a first device in a first network, from a third device in a second network, resource configuration supporting communication between the first device and a second device in the first network, the communication comprising more than one traffic type, wherein a first traffic type of the more than one traffic type is for data transmission between the first device and the second device without involving the third device, and a second traffic type of the more than one traffic type is for data transmission between the second device and the third device via the first device; determining, based at least on the resource configuration and the more than one traffic type, at least one resource pool to be used for the communication between the first device and the second device; and transmitting, to the second device, information indicative of the at least one resource pool.

In a fifth aspect, there is provided a method. The method comprises receiving, at a second device in a first network, from a first device in the first network, information indicative of at least one resource pool to be used for communication between the first device and the second device, the communication comprising more than one traffic type, wherein a first traffic type of the more than one traffic type is for data transmission between the first device and the second device without involving a third device in a second network, a second traffic type of the more than one traffic type is for data transmission between the second device and the third device via the first device; and performing the communication with the first device by using the at least one resource pool.

In a sixth aspect, there is provided a method. The method comprises transmitting, from a third device in a second network, to a first device in a first network, resource configuration supporting communication between the first device and a second device in the first network, the communication comprising more than one traffic type, wherein a first traffic type of the more than one traffic type is for data transmission between the first device and the second device without involving the third device, a second traffic type of the more than one traffic type is for data transmission between the second device and the third device via the first device.

In a seventh aspect, there is provided an apparatus as a first device in a first network comprising means for obtaining, from a third device in a second device, resource configuration supporting communication between the first device and a second device in the first network, the communication comprising more than one traffic type, wherein a first traffic type of the more than one traffic type is for data transmission between the first device and the second device without involving the third device, and a second traffic type of the more than one traffic type is for data transmission between the second device and the third device via the first device; means for determining, based at least on the resource configuration and the more than one traffic type, at least one resource pool to be used for the communication between the first device and the second device; and means for transmitting, to the second device, information indicative of the at least one resource pool.

In an eighth aspect, there is provided an apparatus as a second device in a first network comprising means for receiving, from a first device in the first network, information indicative of at least one resource pool to be used for communication between the first device and the second device, the communication comprising more than one traffic type, wherein a first traffic type of the more than one traffic type is for data transmission between the first device and the second device without involving a third device in a second network, and a second traffic type of the more than one traffic type is for data transmission between the second device and the third device via the first device; and means for performing the communication with the first device by using the at least one resource pool.

In a ninth aspect, there is provided an apparatus as a third device in a second network comprising means for transmitting, to a first device in a first network, resource configuration supporting communication between the first device and a second device in the first network, the communication comprising more than one traffic type, wherein a first traffic type of the more than one traffic type is for data transmission between the first device and the second device without involving the third device, and a second traffic type of the more than one traffic type is for data transmission between the second device and the third device via the first device.

In a tenth aspect, there is provided a computer readable medium having a computer program stored thereon which, when executed by at least one processor of a device, causes the device to carry out the method according to the fourth aspect, the fifth aspect and the sixth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
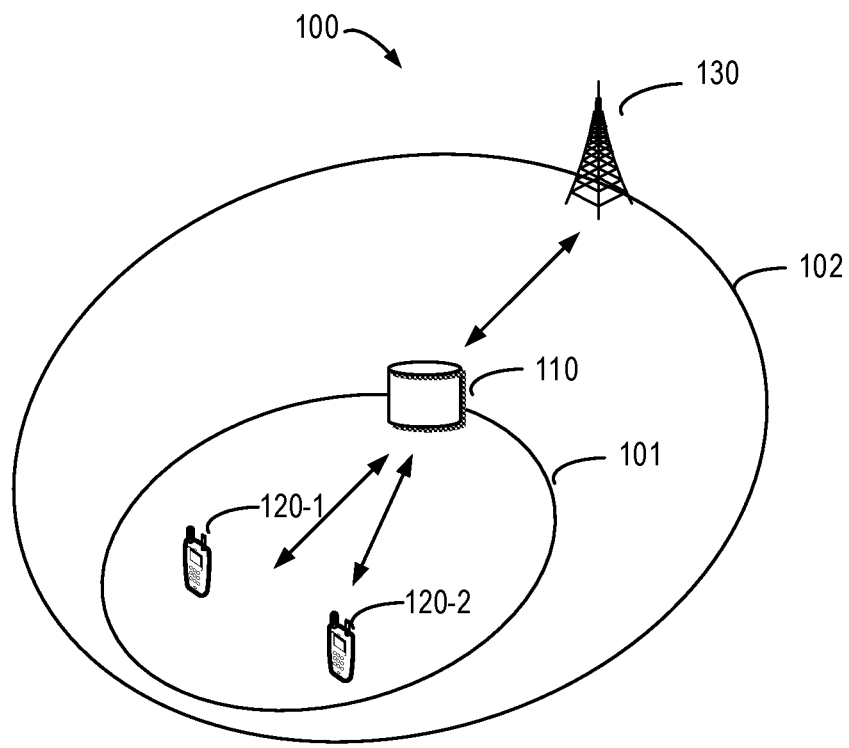
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUS (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 may comprise an access point (AP) 110 (hereinafter may also be referred to as a first device 110). The AP 110 may be implemented as a terminal device or a network device. The communication network 100 may also comprise terminal devices 120-1 and 120-2 (hereinafter may also be referred to as an in-X subnetwork terminal device 120 or a second device 120 collectively). The AP 110 may communicate with the terminal devices 120-1 and 120-2 in a coverage 101, which may be referred to as an in-X subnetwork. The in-X subnetwork may be considered as a part of the communication network 100.

The communication network 100 may further comprise a network device 130 (hereinafter may also be referred to as a third device 130 collectively), which may communicate with the AP 110 in a coverage 102. In some scenarios, the coverage 101 may be considered as being in the coverage 102. In some other scenarios, the coverage 101 may be considered as being out of the coverage 102.

It is to be understood that the number of network devices and terminal devices shown in FIG. 1 is given for the purpose of illustration without suggesting any limitations. The communication network 100 may include any suitable number of network devices and terminal devices.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols, future communication protocols, like 6G for example. The techniques described herein may be used for the wireless networks and radio technologies mentioned above as well as other wireless networks and radio technologies. For clarity, certain aspects of the techniques are described below for NR, and NR terminology is used in much of the description below.

As mentioned above, 6G radio access technology may expect extreme high requirements in terms of latency, reliability and/or throughput. A concept of in-X subnetworks is to be proposed to support these requirements. It is to be understood that the in-X subnetworks may be referred to as in-X cells, which are semi-autonomous highly specialized cells with limited coverage to be installed in locations where high-performance requirements are demanded, such as production modules vehicles, or human bodies for critical functions like heartbeat control. The in-X cells may involve in-factory/robot cells, in-vehicle cells and in-body cells, etc.

The in-X subnetworks/in-X cells may have some specific features. For example, the in-X subnetworks/in-X cells may support extreme Ultra Reliable Low Latency Communications (URLLC) requirements e.g., up to 9 nines of reliability in latency of 100 us, thus cable-like communication quality can be provided for high time critical data traffics that are processed locally within subnetwork. These traffics may be referred to as local traffics.

Furthermore, the in-X subnetworks/in-X cells may be implemented with low transmit power and the resultant limited coverage e.g., lower than 10 meters and the devices may have small form factors. The in-X subnetworks/in-X cells may be implemented as a hierarchical in-X cell structure with one AP and the other UEs. The AP may be a UE-type device or a gNB-type device and it controls the operations of the in-X subnetworks/in-X cells. The in-X subnetwork/in-X cell devices, i.e., the in-X subnetwork/in-X cell UEs may have low mobility across different subnetworks, but the AP may move together with the associated in-X subnetwork/in-X cell devices.

The in-X subnetwork/in-X cell devices can be considered as part of larger 6G Wide Area Network (WAN, e.g., to support medium/non-time critical traffic which is conveyed to 6G network from the in-X terminal devices via the in-X AP and processed in edge/cloud server, which may be called non-local traffic), while on the other hand the in-X subnetwork/in-X cell can continue the operations Out of Coverage (OoC) of the WAN.

It is to be understood that the terms in-X subnetwork/in-X cell may also be replaced by any other suitable terms associated with a network/cell/region/area/range/structure/usage/scenario which have one or more features as mentioned above.

Currently, a framework of in-X subnetwork to support both local traffic and non-local traffic and in or out of cellular network overage still needs to be designed and discussed. Furthermore, the radio resource structuring, procedures of resource pool initial configuration and reconfigurations and the associated signaling mechanisms may also need to be considered.

The present disclosure proposes a solution of configuration for in-X subnetwork. In this solution, the AP may obtain resource configuration associated with communication between the AP and a terminal device in the in-X subnetwork which is associated with local traffic or non-local traffic. The in-X subnetwork may be in the coverage of the network in which the AP is allowed to communicate with a network device, such as a 6G base station (BS). The AP may determine, at least based on the resource configuration, at least one resource pool to be used for the communication between the AP and the terminal device in the in-X subnetwork and transmit, to the terminal device in the in-X subnetwork, information indicative of the at least one resource pool.

Figure 2:
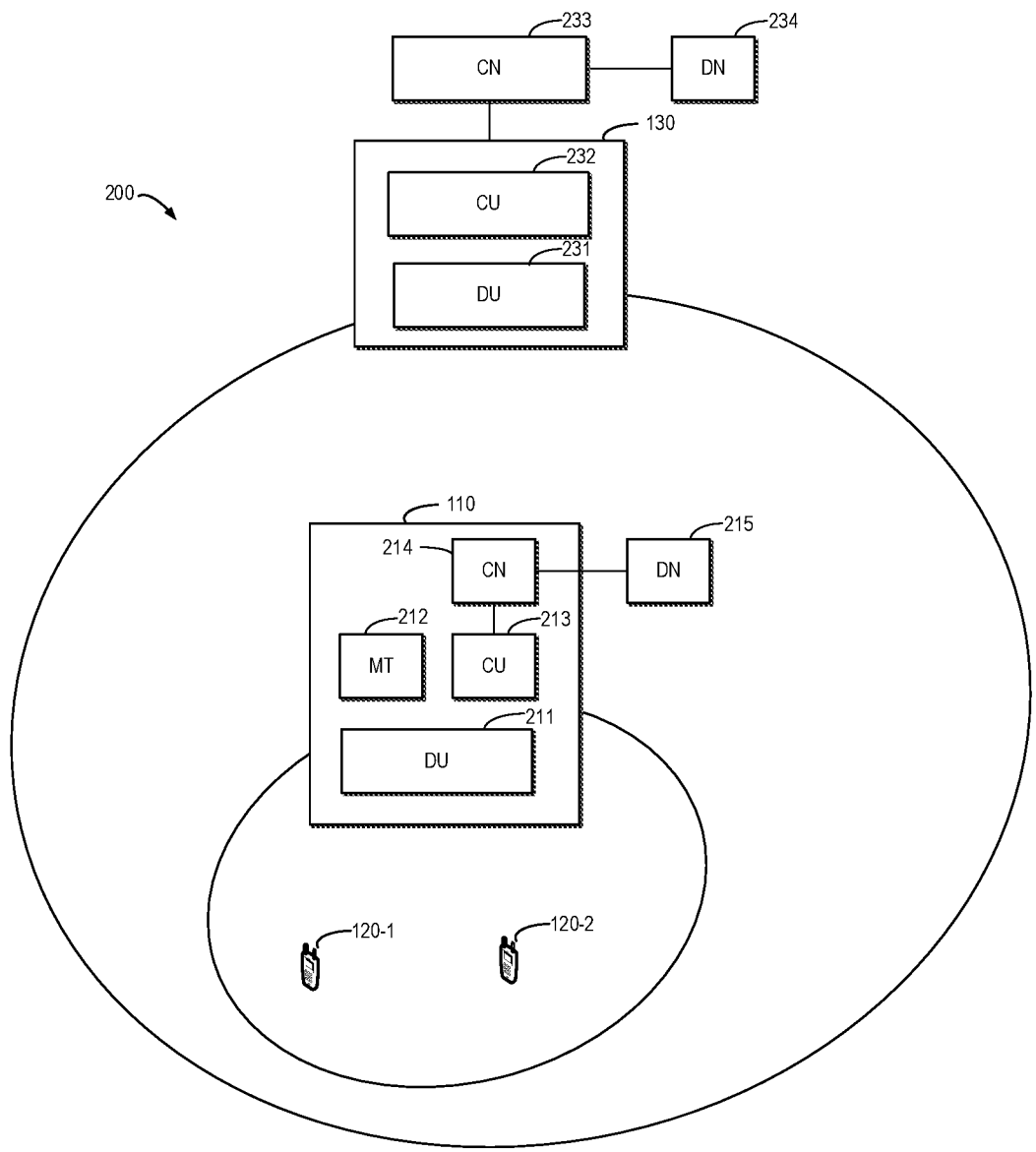
FIG. 2 illustrates an example of in-X subnetwork structure according to some example embodiments of the present disclosure.

To further clarify the structure and the communication mechanism associated with the in-X subnetwork, FIG. 2 shows an example of in-X subnetwork structure according to some example embodiments of the present disclosure.

Now the reference is made to FIG. 2, the communication network 200 may consist of an AP 110 and in-X subnetwork terminal devices 120-1 and 120-2, which constitute an in-X subnetwork. The AP 110 may consist of at least modules of a distributed unit (DU) 211, a mobile terminal (MT) 212, a centralized unit (CU) 213, and an integrated/embedded core network (CN) 214 having (partial or full) functions with a potential interface to a local traffic server, i.e., data network (DN) 215, which may be outside or inside of the AP 110. For example, the DU 211 may be implemented with functions of Physical (PHY) and lower Layer2 (L2) sublayers, serving both local traffic and non-local traffic. The MT 212 may be used to implement the role of terminal device in perspective of cellular BS. The CU 213 may be used to support the local traffic together with CN 214 and DN 215.

The AP 110 may communicate with in-X subnetwork terminal devices 120-1 and 120-2 in the in-X subnetwork.

The communication network 200 may also comprise a network device such as a 6G BS 130, which may communicate with AP 110. The 6G BS 130 may consist of a DU 231, a CU 232 providing connections with a CN 233 and a DN 234.

In the communication network 200, the AP 110 may act as a terminal device in 6G BS 130 perspective with the 2$^{nd}$ air interface, meanwhile as a network device in in-X subnetwork terminal devices 120-1 and 120-2 perspective with the 1$^{st}$ air interface. The AP 110 of the in-X subnetwork may or may not be in the coverage of the 6G BS 130. When not in coverage of 6G BS 130, the operations of the in-X subnetwork may continue for the local traffic.

The AP 110 may be integrated with embedded local CN full or partial functions and traffic server, to serves the in-X subnetwork terminal devices 120-1 and 120-2 with high time critical local services. The AP 110 may also support non-local services without high time critical requirements by forwarding the non-local traffic between the in-X subnetwork terminal devices 120 and the 6G WAN.

Principle and implementations of the present disclosure will be described in detail below with reference to FIG. 3, which shows a signaling chart illustrating a process 300 of configuration for in-X subnetwork according to some example embodiments of the present disclosure. For the purpose of discussion, the process 300 will be described with reference to FIG. 1. The process 300 may involve the AP 110, the in-X subnetwork terminal device 120, the network device 130 as illustrated in FIG. 1. Furthermore, the process 300 may involve a CN/DN function 140.

Figure 3:
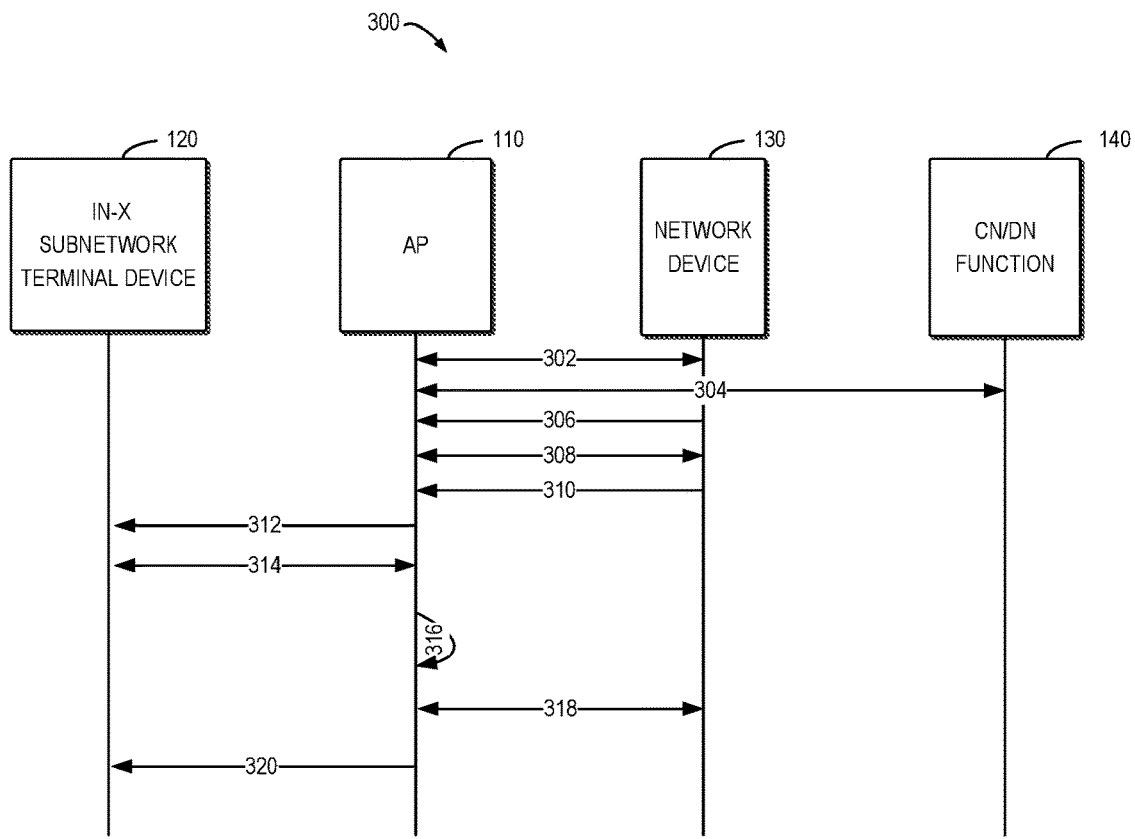
FIG. 3 shows a signaling chart illustrating a process of configuration for in-X subnetwork according to some example embodiments of the present disclosure.

In some example embodiments, as shown in FIG. 3, the AP 110 may perform, at step 302, an initial access to the network device 130 and then RRC connection establishment may be completed. Then the AP 110 may perform, at step 304, the in-X subnetwork registration and authentication to the CN/DN function 140. The CN/DN function 140 may provide the in-X subnetwork information (e.g., on QoS control) for the network device 130.

The network device 130 may send, at step 306, resource configuration to the AP 110, indicating at least one of a first carrier part comprising one or more resource pools available for the local traffic and a second carrier part comprising one or more resource pools available for the non-local traffic or local traffic. Here each resource pool may consist of contiguous or non-contiguous (or say distributed) frequency resources. Then, at step 308, the AP 110 may perform channel measurements as per the measurement configuration from the network device 130 over resource pools (RPs) within a first carrier part and/or a second carrier part and then report the measurement results to the network device 130. Based on the measurement report, the network device 130 may select at least one resource pool and indicate to the AP 110 at step 310.

Then, the AP 110 determines the at least one resource pool as active resource pool based on the indication from the network device 130 and at step 312 the AP 110 indicate the at least one resource pool to the in-X subnetwork terminal device 120 for local traffic and/or non-local traffic via a physical broadcast channel (PBCH) or some other channel alike.

It is to be understood that the second carrier part may consist of resources orthogonal to the radio resources of the first carrier part, which implies that if it is used for non-local traffic, the transmissions of local traffic and non-local traffic are scheduled independently within the first and the second carrier parts, respectively, by respective Medium Access Control (MAC) sublayer functions.

Without the assistance of the network device 130, the AP 110 may use the pre-configured RP(s) as the active RP(s) or randomly select at least one out of all the RPs as the active RP(s) and indicate the active resource pools to the in-X subnetwork terminal device 120 at step 312.

At step 314, the AP 110 may transmit a measurement configuration to the in-X subnetwork terminal device 120 and the terminal device 120 reports the measurement results to the AP 110. At step 316, the AP 110 may consolidate the received measurement results with the measurement results obtained by itself. Here, the measurement results may include the measurement results measured over the one or more resource pools and/or the measurement results measured over the specific at least one resource pool being used by the in-X subnetwork associated with the AP 110.

At step 318, the AP 110 may report the consolidated measurement results to the network device 130 and based on at least the measurement results the network device 130 may re-configure at least one resource pool and indicate to the AP 110 for subsequent data transmissions in the in-X subnetwork. At step 320, the AP 110 indicates the reconfigured at least one resource pool to the in-X subnetwork terminal device 120.

In some example embodiments, the indication of the active RP(s) can be transmitted via a physical broadcast channel (PBCH) or some other channel alike, which may be transmitted periodically by the AP 110 to the in-X subnetwork terminal device 120.

Furthermore, the AP 110 may indicate to the in-X subnetwork terminal device 120 configuration information on the associated carrier part(s), the one or more RPs comprised in each carrier part via the PBCH or some other channel alike.

In the NR system, the PBCH, together with the associated synchronization signals, constitute the synchronization signal block (SSB). The SSB may be within the first or the second carrier part. The in-X subnetwork terminal device 120 get aware of the configuration information of the first and the second carrier part, such that they know which resources they shall use for the transmissions of local traffic and/or non-local traffic, and they also derive the location of the active RP(s) and inactive RPs such that they know where to make the local traffic transmission and interference measurement.

Figure 4:
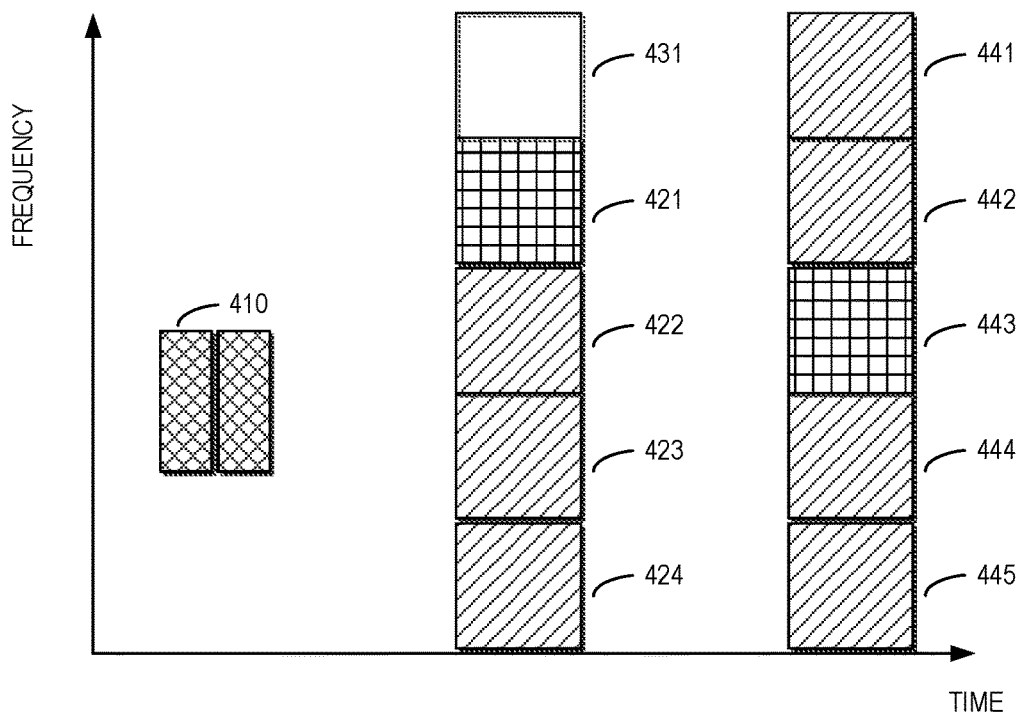
FIG. 4 shows an example of resource configuration according to some example embodiments of the present disclosure.

FIG. 4 shows an example of resource allocation according to some example embodiments of the present disclosure.

As shown in FIG. 4, for example, the SSB 410 may carry the configuration information on the associated carrier part(s), the one or more RPs comprised in each carrier part and the the active RP(s) determined by the AP 110.

For example, the configuration information may indicate the first carrier part comprises RPs 421-424 and the RP 422 is the active RP in the first carrier part to be used for the local traffic and the RP 431 in the second carrier part to be used for the non-local traffic.

For example, the configuration information may indicate only the first carrier part, which comprises RPs 441-445 and the RP 443 is the active RP in the first carrier part to be used for the local traffic.

Referring back to FIG. 3, after the connection between the AP 110 and the in-X subnetwork terminal device 120 is established, the AP 110 may also indicate to the terminal device 120, at step 320, to update the RP configuration, for example, a change of the active RP(s).

For example, the AP 110 may determine to change the active RP(s) based on the measurement on the current active RP(s) and one or more other RPs comprised in the first carrier part and/or the second carrier part. The measurement may be performed by the AP 110 itself and/or performed by the in-X subnetwork terminal device 120.

As an option, the AP 110 may determine the updated active RP(s) based on the measurement result, for example, when the AP 110 out of the coverage of the network device 130.

As another option, when the AP 110 within the coverage of the network device 130, the AP 110 may report the measurement result to the network device 130. The network device 130 may determine the updated active RP(s) based on the measurement result and inform the AP 110 to reconfigure the active RP(s) based on the updated active RP(s) determined by the network device 130.

Then the AP 110 may transmit, at step 320, an indication of the reconfigured/updated active RP(s) to the in-X subnetwork terminal device 120, for the in-X subnetwork terminal device 120 to perform active RP(s) switching.

The indication of the reconfigured/updated active RP(s) may be transmitted PBCH or some other channel alike.

The reconfigured/updated active RP(s) may not take effect until a specific time offset after the beginning of the current PBCH period. For example, the specific time offset may be fixed to a specific value e.g., a specific number of OFDM symbols, or slots, or subframes. It is also possible that the specific time offset may be configured semi-statically e.g., by RRC signalling or configured dynamically e.g., explicitly indicated by the PBCH.

The change of the active RP(s) may be indicated during the previous PBCH period in some way, e.g., broadcast this information via specific control or data channel, such that all the in-X subnetwork terminal device 120 of this subnetwork will not miss the active RP change indication. Then the reconfigured/updated active RP(s) may take effect after a specific time offset after the beginning of the current PBCH period.

Figure 5:
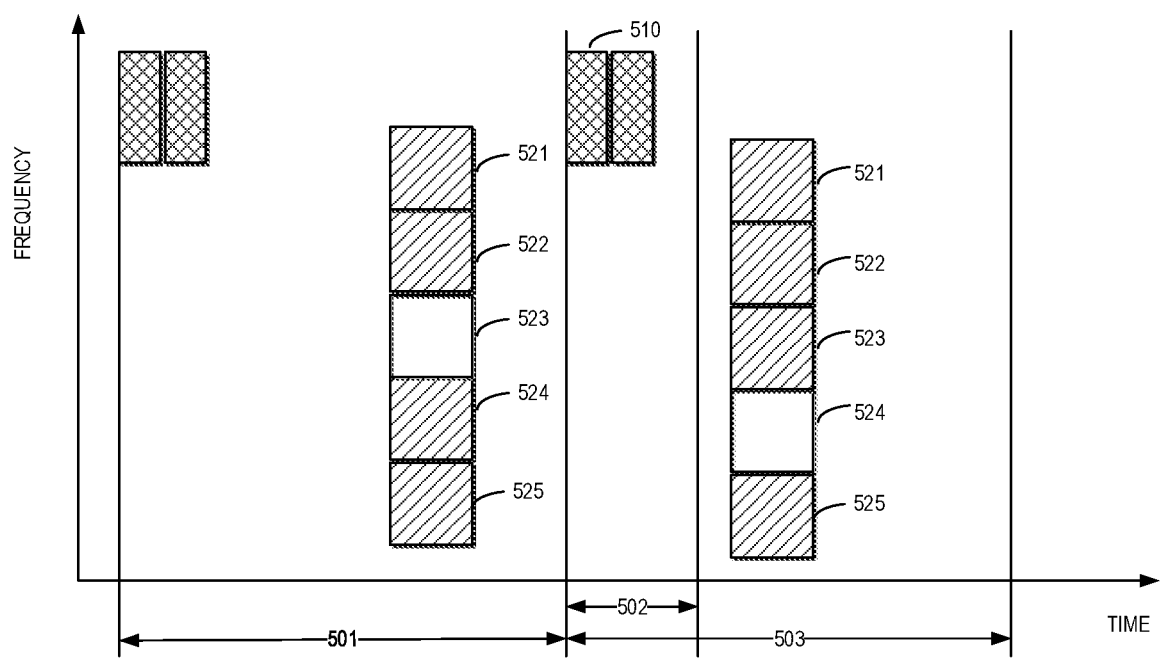
FIG. 5 shows an example of resource pool switching mechanisms according to some example embodiments of the present disclosure.

FIG. 5 shows an example of resource pool switching mechanisms according to some example embodiments of the present disclosure.

As shown in FIG. 5, the change of the active RP(s) may be notified via some signalling transmissions in the previous PBCH period 501 and the detailed information on the active RP change is indicated via SSB 510. For example, the active RP is to be changed from RP 523 to RP 524. Then the active RP(s) switching may occur after a time offset 502 after the subsequent PBCH period 503 begins.

It is to be understood that reconfiguration of the active RP(s) may performed periodically.

Figure 6:
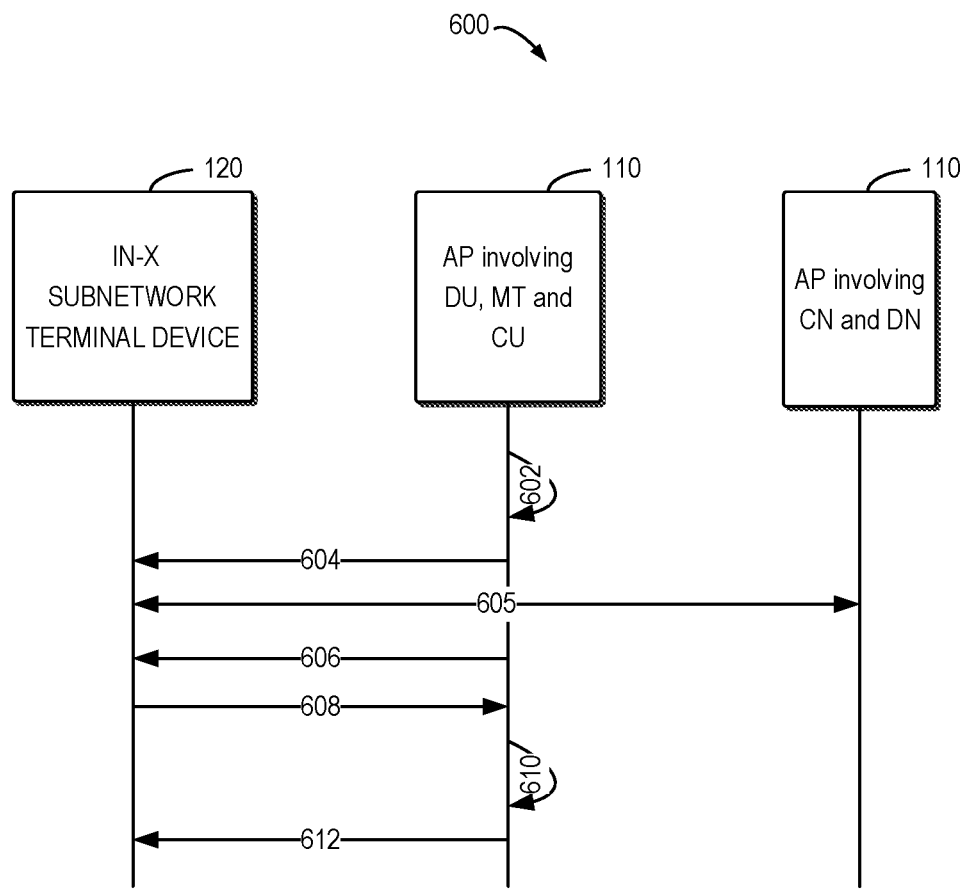
FIG. 6 shows a signaling chart illustrating a process of configuration for in-X subnetwork according to some example embodiments of the present disclosure.

In some scenarios, assuming that the subnetwork AP is out of BS coverage, thus the subnetwork AP cannot make registration and authentication to the core network and particularly, the subnetwork cannot enjoy the centralized coordination by the BS for inter-subnetwork interference control. This procedure may be described in detail with FIG. 6, which shows a signaling chart illustrating a process 600 of configuration for in-X subnetwork according to some example embodiments of the present disclosure. The process 600 may involve the DU 211, the MT 212 and the CU 213 of the AP 110, the in-X subnetwork terminal device 120 and the CN 214 and DN 215 of the AP 110 as illustrated in FIG. 2.

At step 602, the AP 110 (involving the DU 211, the MT 212 and the CU 213) may autonomously determine the initial configuration for active RP(s). For example, the determination is based on pre-configuration. Alternatively, the AP 110 may make the measurements over partial or all the RPs and determine the active RP(s) based on the measurement results.

At step 604, the AP 110 may transmit 604 the indication of the active RP(s) to the in-X subnetwork terminal device 120. Then the in-X subnetwork terminal device 120 may perform 605 an initial access to data transmissions with the AP 110 (involving the CN 214 and DN 215).

After the connection between the AP 110 and the in-X subnetwork terminal device 120 is established, the AP 110 may configure, at step 606, the in-X subnetwork terminal device 120 with the measurement and reporting for RPs within each carrier part, then the in-X subnetwork terminal device 120 may perform the measurement on the associated RPs and report, at step 608, to the AP 110 as per the configuration.

Based on the measurement results from the in-X subnetwork terminal device 120, the AP 110 may determine the active RP(s) reconfiguration autonomously at step 610. At step 612, the AP 110 may indicate the RP switching to the in-X subnetwork terminal device 120 in the subnetwork. Then the data transmission between in-X subnetwork terminal device 120 and the AP 110 may be carried over the updated active RP(s).

With the solution of the present disclosure, radio resource structuring, procedures of resource pool initial configuration/reconfigurations and the associated signaling mechanisms are designed to enable in-X subnetworks to support both local traffic with potential extreme URLLC requirements and non-local traffic without such stringent requirements under the in or out of cellular network coverage scenarios.

Figure 7:
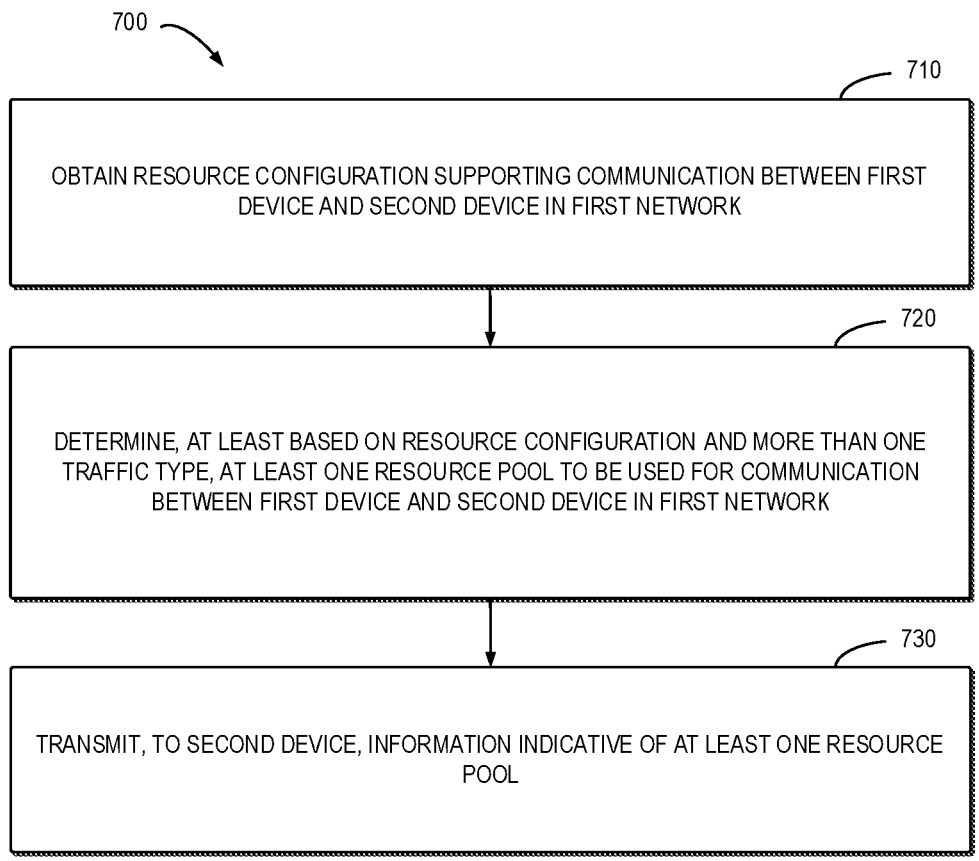
FIG. 7 shows a flowchart of an example method of configuration for in-X subnetwork according to some example embodiments of the present disclosure.

FIG. 7 shows a flowchart of an example method 700 of configuration for in-X subnetwork according to some example embodiments of the present disclosure. The method 700 can be implemented at the first device 110 in a first network as shown in FIG. 1. For the purpose of discussion, the method 700 will be described with reference to FIG. 1.

At 710, the first device obtains, from a third device in a second network, resource configuration supporting communication between the first device and a second device in the first network. The communication comprises more than one traffic type, wherein a first traffic type of the more than one traffic type is for data transmission between the first device and the second device without involving the third device, and a second traffic type of the more than one traffic type is for data transmission between the second device and the third device via the first device.

At 720, the first device determines, based at least on the resource configuration and the more than one traffic type, at least one resource pool to be used for the communication between the first device and the second device.

At 730, the first device transmits, to the second device, information indicative of at least one resource pool.

In some example embodiments, the resource configuration indicates at least one of a first carrier part comprising one or more resource pools available for the first traffic type; or a second carrier part comprising one or more resource pools available for at least one of the first traffic type and the second traffic type.

In some example embodiments, the first device may determine the at least one resources pool from the one or more resource pools comprised in the first carrier part.

In some example embodiments, the first device may determine the at least one resource pool from the one or more resource pools comprised in the second carrier part for one of the first traffic type, if the first device is located out of a coverage of the second network or there is no data transmission of the second traffic type between the third device and the second device within a time period; and the second traffic type, if the first device is located within the coverage of the second network and there is data transmission of the second traffic type between the third device and the second device within the time period.

In some example embodiments, the first device may transmit, to the second device, measurement configuration for at least one of the one or more resource pools comprised in the first carrier part and the one or more resource pools comprised in the second carrier part.

In some example embodiments, the first device may obtain at least one of a first measurement result of a first measurement performed by the first device; and a second measurement result of a second measurement performed by the second device based on the measurement configuration.

In some example embodiments, the first device may transmit, to the third device, a measurement report comprising at least one of the obtained first measurement result, and the obtained second measurement result; receive, from the third device, the information indicative of the at least one resource pool determined by the third device based on the measurement report.

In some example embodiments, the first device may determine, from at least one of the one or more resource pools comprised in the first carrier part and the one or more resource pools comprised in the second carrier part, the at least one resource pool based on at least one of: the at least one resource pool, and the at least one reconfigured resource pool.

In some example embodiments, the first device may obtain at least one of a third measurement result of a third measurement on the at least one resource pool, the third measurement being performed by the first device, and a fourth measurement result of a fourth measurement on the at least one resource pool, the fourth measurement being performed by the second device.

In some example embodiments, the first device may transmit, to the third device, a measurement report comprising at least one of the obtained first measurement result, the obtained second measurement result; the obtained third measurement result, and the obtained fourth measurement result; receive, from the third device, information indicative of at least one reconfigured resource pool to be used for the communication between the first device and the second device determined by the third device based on the measurement report; and transmit, to the second device, the information indicative of the at least one reconfigured resource pool.

In some example embodiments, the first device may determine, from at least one of the one or more resource pools comprised in the first carrier part and the one or more resource pools comprised in the second carrier part, at least one reconfigured resource pool to be used for the communication between the first device and the second device based at least on at least one of the obtained first measurement result, the obtained second measurement result; the obtained third measurement result, and the obtained fourth measurement result; and transmit, to the second device, information indicative of the at least one reconfigured resource pool.

In some example embodiments, the first device may transmit, to the second device via a physical broadcast channel, at least one of the at least one resource pool, and the at least one reconfigured resource pool.

In some example embodiments, the first device comprises a terminal device or a network device, the second device comprises a terminal device and the third device comprises a network device.

Figure 8:
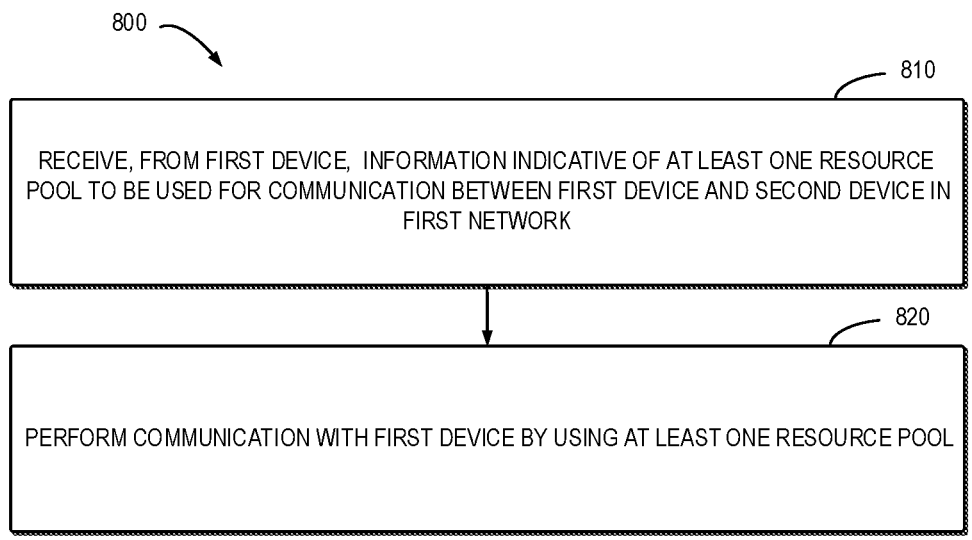
FIG. 8 shows a flowchart of an example method of configuration for in-X subnetwork according to some example embodiments of the present disclosure.

FIG. 8 shows a flowchart of an example method 800 of configuration for in-X subnetwork according to some example embodiments of the present disclosure. The method 800 can be implemented at the second device 120 in a first network as shown in FIG. 1. For the purpose of discussion, the method 800 will be described with reference to FIG. 1.

At 810, the second device receives, from a first device in the first network, information indicative of at least one resource pool to be used for communication between the first device and the second device, the communication comprising more than one traffic type, wherein a first traffic type of the more than one traffic type is for data transmission between the first device and the second device without involving a third device in a second network, and a second traffic type is for data transmission between the second device and the third device via the first device.

At 820, the second device may perform the communication with the first device by using the at least one resource pool.

In some example embodiments, the second device may receive the information indicative of the at least one resource pool via a physical broadcast channel.

In some example embodiments, the second device may receive measurement configuration for at least one of one or more resource pools comprised in at least one of the first carrier part and the one or more resource pools comprised in the second carrier part, the one or more resource pools comprised in the first carrier part being available for the first traffic type, the one or more resource pools comprised in the second carrier part being available for at least one of the first traffic type and the second traffic type.

In some example embodiments, the second device may perform a second measurement based on the measurement configuration; and report a second measurement result of the second measurement to the first device.

In some example embodiments, the second device may perform a fourth measurement on the at least one resource pool; and report a fourth measurement result of the fourth measurement to the first device.

In some example embodiments, the second device may receive, from the first device, information indicative of at least one reconfigured resource pool to be used for the communication between the first device and the second device; and perform the communication with the first device by using the at least one reconfigured resource pool.

In some example embodiments, the second device may receive the information indicative of the at least one reconfigured resource pool via a physical broadcast channel.

In some example embodiments, if the second device determines, in a first physical broadcast channel time period, that the at least one resource pool is to be reconfigured and the information indicative of the at least one reconfigured resource pool is received in a second physical broadcast channel time period, the second device may use the at least one reconfigured resource pool after a time offset after a beginning of the second physical broadcast channel time period, wherein the second physical broadcast channel time period is subsequent to the first physical broadcast channel time period.

In some example embodiments, the time offset may be set to be a predetermined value or configured by at least one of a radio resource control signaling or an indication received via the physical broadcast channel.

In some example embodiments, the first device comprises a terminal device or a network device, the second device comprises a terminal device and the third device comprises a network device.

Figure 9:
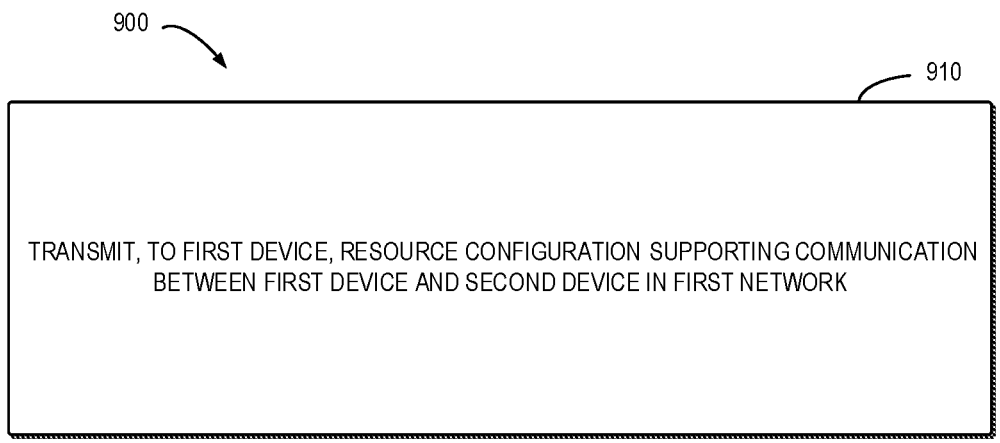
FIG. 9 shows a flowchart of an example method of configuration for in-X subnetwork according to some example embodiments of the present disclosure.

FIG. 9 shows a flowchart of an example method 900 of configuration for in-X subnetwork according to some example embodiments of the present disclosure. The method 900 can be implemented at the third device 130 in a second network as shown in FIG. 1. For the purpose of discussion, the method 900 will be described with reference to FIG. 1.

At 910, the third device transmits, to a first device in a first network, resource configuration supporting communication between the first device and a second device in the first network, the communication comprising more than one traffic type, wherein a first traffic type of the more than one traffic type is for data transmission between the first device and the second device without involving the third device, and a second traffic type of the more than one traffic type is for the data transmission between the second device and the third device via the first device.

In some example embodiments, the resource configuration indicates at least one of a first carrier part comprising one or more resource pools available for the first traffic type; or a second carrier part comprising one or more resource pools available for at least one of the first traffic type and the second traffic type.

In some example embodiments, the third device may receive, from the first device, a measurement report comprising at least one of a first measurement result of a first measurement performed by the first device; and a second measurement result of a second measurement performed by the second device based on the measurement configuration, the measurement configuration for at least one of the one or more resource pools comprised in the first carrier part and the one or more resource pools comprised in the second carrier part, the one or more resource pools comprised in the first carrier part being available for the first traffic type, the one or more resource pools comprised in the second carrier part being available for at least one of the first traffic type and the second traffic type the measurement configuration for at least one of the one or more resource pools comprised in the first carrier part and the one or more resource pools comprised in the second carrier part, the one or more resource pools comprised in the first carrier part being available for the first traffic type, the one or more resource pools comprised in the second carrier part being available for at least one of the first traffic type and the second traffic type; determine, based on the measurement report, at least one resource pool to be used for the communication between the first device and the second device; and transmit information indicative of the at least one resource pool to the first device.

In some example embodiments, the third device may receive, from the first device, a third measurement result of a third measurement on the at least one resource pool, the third measurement being performed by the first device, and a fourth measurement result of a fourth measurement on the at least one resource pool, the fourth measurement being performed by the second device. If the third device determines based on the measurement report, that the at least one resource pool to be reconfigured, the third device may determine at least one reconfigured resource pool to be used for the communication between the first device and the second device; and transmit information indicative of the at least one reconfigured resource pool to the first device.

In some example embodiments, the first device comprises a terminal device or a network device, the second device comprises a terminal device and the third device comprises a network device.

In some example embodiments, an apparatus capable of performing the method 700 (for example, implemented at the AP 110) may comprise means for performing the respective steps of the method 700. The means may be implemented in any suitable form. For example, the means may be implemented in a circuitry and/or software module.

In some example embodiments, the apparatus as a first device in a first network comprises means for obtaining, from a third device in a second device, resource configuration supporting communication between the first device and a second device in the first network, the communication comprising more than one traffic type, wherein a first traffic type of the more than one traffic type is for data transmission between the first device and the second device without involving the third device, and a second traffic type of the more than one traffic type is for data transmission between the second device and the third device via the first device; means for determining, based at least on the resource configuration and the more than one traffic type, at least one resource pool to be used for the communication between the first device and the second device; and means for transmitting, to the second device, information indicative of the at least one resource pool.

In some example embodiments, an apparatus capable of performing the method 800 (for example, implemented at the terminal device 120) may comprise means for performing the respective steps of the method 800. The means may be implemented in any suitable form. For example, the means may be implemented in a circuitry and/or software module.

In some example embodiments, the apparatus as a second device from a first network comprises means for receiving, from a first device in the first network, at least one resource pool to be used for communication between the first device and the second device, the communication comprising more than one traffic type, wherein a first traffic type of the more than one traffic type is for data transmission between the first device and the second device without involving a third device in a second network, and a second traffic type of the more than one traffic type is for data transmission between the second device and the third device via the first device; and means for performing the communication with the first device by using the at least one resource pool.

In some example embodiments, an apparatus capable of performing the method 900 (for example, implemented at the network device 130) may comprise means for performing the respective steps of the method 900. The means may be implemented in any suitable form. For example, the means may be implemented in a circuitry and/or software module.

In some example embodiments, the apparatus as a third device in a second network comprises means for transmitting, to a first device in a first network, resource configuration supporting communication between the first device and a second device in the first network, the communication comprising more than one traffic type, wherein a first traffic type of the more than one traffic type is for data transmission between the first device and the second device without involving the third device, and a second traffic type of the more than one traffic type is for data transmission between the second device and the third device via the first device.

Figure 10:
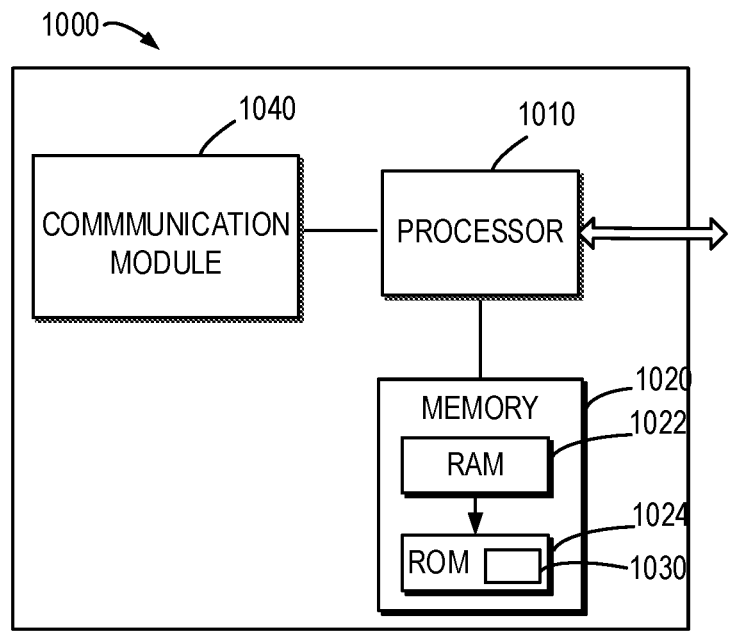
FIG. 10 shows a simplified block diagram of a device that is suitable for implementing example embodiments of the present disclosure.

FIG. 10 is a simplified block diagram of a device 1000 that is suitable for implementing embodiments of the present disclosure. The device 1000 may be provided to implement the communication device, for example the AP 110, the terminal device 120 and the network device 130 as shown in FIG. 1. As shown, the device 1000 includes one or more processors 1010, one or more memories 1040 coupled to the processor 1010, and one or more communication modules 1040 coupled to the processor 1010.

The communication module 1040 is for bidirectional communications. The communication module 1040 has one or more communication interfaces to facilitate communication with one or more other modules or devices. The communication interfaces may represent any interface that is necessary for communication with other network elements. In some example embodiments, the communication module 1040 may include at least one antenna.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The program 1030 may be stored in the ROM 1024. The processor 1010 may perform any suitable actions and processing by loading the program 1030 into the RAM 1022.

The embodiments of the present disclosure may be implemented by means of the program 1030 so that the device 1000 may perform any process of the disclosure as discussed with reference to FIGS. 2 to 9. The embodiments of the present disclosure may also be implemented by hardware or by a combination of software and hardware.

Figure 11:
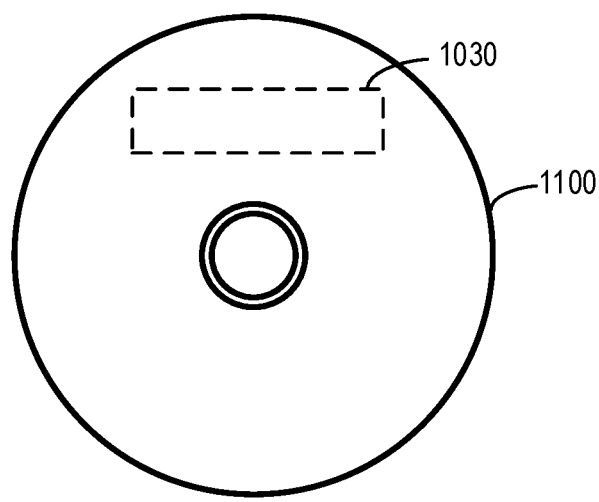
FIG. 11 shows a block diagram of an example computer readable medium in accordance with some embodiments of the present disclosure.

In some embodiments, the program 1030 may be tangibly contained in a computer readable medium which may be included in the device 1000 (such as in the memory 1020) or other storage devices that are accessible by the device 1000. The device 1000 may load the program 1030 from the computer readable medium to the RAM 1022 for execution. The computer readable medium may include any types of tangible non-volatile storage, such as ROM, EPROM, a flash memory, a hard disk, CD, DVD, and the like. FIG. 11 shows an example of the computer readable medium 1100 in form of CD or DVD. The computer readable medium has the program 1030 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 700-900 as described above with reference to FIGS. 7-9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device in a first network, comprising:
at least one processor; and
at least one memory including computer program codes;
the at least one memory and the computer program codes are configured to, with the at least one processor, cause the first device at least to:
  obtain, from a third device in a second network, resource configuration supporting communication between the first device and a second device in the first network, the communication comprising more than one traffic type,
  wherein a first traffic type of the more than one traffic type is for data transmission between the first device and the second device without involving the third device, and a second traffic type of the more than one traffic type is for data transmission between the second device and the third device via the first device;
  determine, based at least on the resource configuration and the more than one traffic type, at least one resource pool to be used for the communication between the first device and the second device; and
  transmit, to the second device, information indicative of the at least one resource pool; wherein the resource configuration indicates at least one of:
    a first carrier part comprising one or more resource pools available for the first traffic type; and
    a second carrier part comprising one or more resource pools available for at least one of the first traffic type and the second traffic type; and
wherein the first device is caused to determine the at least one resource pool by:
  determining the at least one resource pool from the one or more resource pools comprised in the second carrier part for one of:
    the first traffic type, if the first device is located out of a coverage of the second network or there is no data transmission of the second traffic type between the third device and the second device within a time period; and
    the second traffic type, if the first device is located within the coverage of the second network and there is data transmission of the second traffic type between the third device and the second device within the time period.

* * * * *